(12) United States Patent
Shirvani et al.

(10) Patent No.: US 9,292,295 B2
(45) Date of Patent: Mar. 22, 2016

(54) VOLTAGE DROOP REDUCTION BY DELAYED BACK-PROPAGATION OF PIPELINE READY SIGNAL

(71) Applicant: NVIDIA Corporation, Santa Clara, CA (US)

(72) Inventors: Philip Payman Shirvani, San Jose, CA (US); Peter Benjamin Sommers, Santa Clara, CA (US); Eric T. Anderson, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 407 days.

(21) Appl. No.: 13/914,528

(22) Filed: Jun. 10, 2013

(65) Prior Publication Data

US 2014/0365750 A1    Dec. 11, 2014

(51) Int. Cl.
*G06F 1/04* (2006.01)
*G06F 9/38* (2006.01)

(52) U.S. Cl.
CPC .................. *G06F 9/3871* (2013.01)

(58) Field of Classification Search
CPC ........................................ G06F 9/38
See application file for complete search history.

(56) References Cited

U.S. PATENT DOCUMENTS

| 6,393,579 B1 * | 5/2002 | Piazza | G06F 9/3869 |
| | | | 712/E9.062 |
| 6,931,559 B2 * | 8/2005 | Burns | G06F 1/3203 |
| | | | 710/15 |
| 7,065,665 B2 * | 6/2006 | Jacobson | G06F 1/3203 |
| | | | 712/219 |

* cited by examiner

*Primary Examiner* — Cheng-Yuan Tseng
(74) *Attorney, Agent, or Firm* — Zilka-Kotab, PC

(57) ABSTRACT

A system, method, and computer program product for generating flow-control signals for a processing pipeline is disclosed. The method includes the steps of generating, by a first pipeline stage, a delayed ready signal based on a downstream ready signal received from a second pipeline stage and a throttle disable signal. A downstream valid signal is generated by the first pipeline stage based on an upstream valid signal and the delayed ready signal. An upstream ready signal is generated by the first pipeline stage based on the delayed ready signal and the downstream valid signal.

18 Claims, 7 Drawing Sheets

VOLTAGE DROOP REDUCTION BY DELAYED BACK-PROPAGATION OF PIPELINE READY SIGNAL

FIELD OF THE INVENTION

The present invention relates to digital logic design, and more specifically no technique for reducing voltage droop.

BACKGROUND

Complex digital processors conventionally include one or more processing pipelines in which data is processed at an architecturally appropriate clock speed. A processing pipeline may implement certain operations over several pipeline stages to beneficially achieve relatively high clock speeds and processing throughput. A given pipeline stage may need to stall inbound data if the pipeline stage is not ready to receive the inbound data. The same pipeline stage may need to stall itself if a subsequent pipeline stage is not ready to receive new data. Such stalling behavior may arise for many reasons. For example, a pipeline may need to stall while waiting to access a shared resource, such as an external memory.

A "Ready" signal and a "Valid" signal conventionally implement a flow-control protocol for data being transmitted from a source pipeline stage to a destination pipeline stage. The data is transmitted as a separate signal from the Ready signal and the Valid signal. The data is allowed to progress from the source pipeline stage to the destination pipeline stage if the Ready signal generated by the destination pipeline stage is true and the Valid signal generated by the source pipeline stage is true. If the Ready signal is false, then the destination pipeline stage is stalled and not able to receive the data. When the destination pipeline stage is stalled, the source pipeline stage needs to stall and hold the data when the Valid signal is true. If the Valid signal is false, then corresponding data held in the source pipeline stage is not valid data. This condition is referred to as a bubble. A bubble may be collapsed at the output of the source pipeline stage when the Valid signal is true and the source pipeline stage generates a true Ready signal to accept Valid data at the input of the source pipeline stage.

Data conventionally progresses through all pipeline stages of a given processing pipeline based on a common clock signal in accordance with synchronous design principles. For example, data may progress through an stages of a processing pipeline in lock-step on every positive edge of the clock signal when each pipeline stage generates a true Ready signal. An on-chip power distribution network supplies power to each circuit element within the pipeline. The power distribution network may be characterized as having both distributed inductance and distributed capacitance interposed between an external power source and each circuit element.

In certain scenarios, the processing pipeline is stalled at the output by a interface unit, which may be waiting to access a particular resource. When multiple pipeline stages in the processing pipeline each generate true Valid signals and the interface unit is stalled, a false Ready signal propagates back through each pipeline stage as each pipeline stage generates a false Ready signal until a bubble is reached at the output of a pipeline stage. Therefore, multiple pipeline stages become idle in the same clock cycle and the processing pipeline circuitry consumes less power compared with the previous clock cycle when the processing pipeline was active.

When the interface unit is ready to accept data from the processing pipeline, each of the pipeline stages becomes active and computes new results. A true Ready signal propagates back through each pipeline stage as each pipeline stage generates a true Ready signal. Therefore, multiple pipeline stages become active in the same clock cycle and the processing pipeline circuitry consumes more power compared with the previous clock cycle when the processing pipeline was idle. The sudden change from an idle processing pipeline to an active processing pipeline can cause a relatively sharp spike in current demanded from the power distribution network. Because each pipeline stage operates synchronously to the clock signal, the spike in current is highly correlated over all pipeline stages, which may lead to a transient voltage droop in the power distribution network. The voltage droop may degrade the reliable operating frequency for circuitry within the processing pipeline, leading to reduced system performance.

Thus, there is a need for addressing this issue and/or other issues associated with the prior art.

SUMMARY

A system, method, and computer program product for generating flow-control signals for a processing pipeline is disclosed. The method includes the steps of generating, by a first pipeline stage, a delayed ready signal based on a downstream ready signal received from a second pipeline stage and a throttle disable signal. A downstream valid signal is generated by the first pipeline stage based on an upstream valid signal and the delayed ready signal. An upstream ready signal is generated by the first pipeline stage based on the delayed ready signal and the downstream valid signal.

DETAILED DESCRIPTION

Voltage droop may occur when one or more pipeline stages of a processing pipeline simultaneously transitioning from an idle (low-power) state to an active (high-power) state. The voltage droop may degrade the reliable operating frequency for circuitry within the processing pipeline, leading to reduced system performance. Voltage droop may be avoided by staggering the clock cycles at which different pipeline stages restart processing (i.e., become active) after being idle. More specifically, propagation of the ready signal from downstream pipeline stages to upstream pipeline stages may be delayed. The gradual upstream progression of the ready signal extends the time period during which the different pipeline stages in the processing pipeline each transition from a low power state to a high power state, resulting in a smaller voltage droop.

Figure 1A:
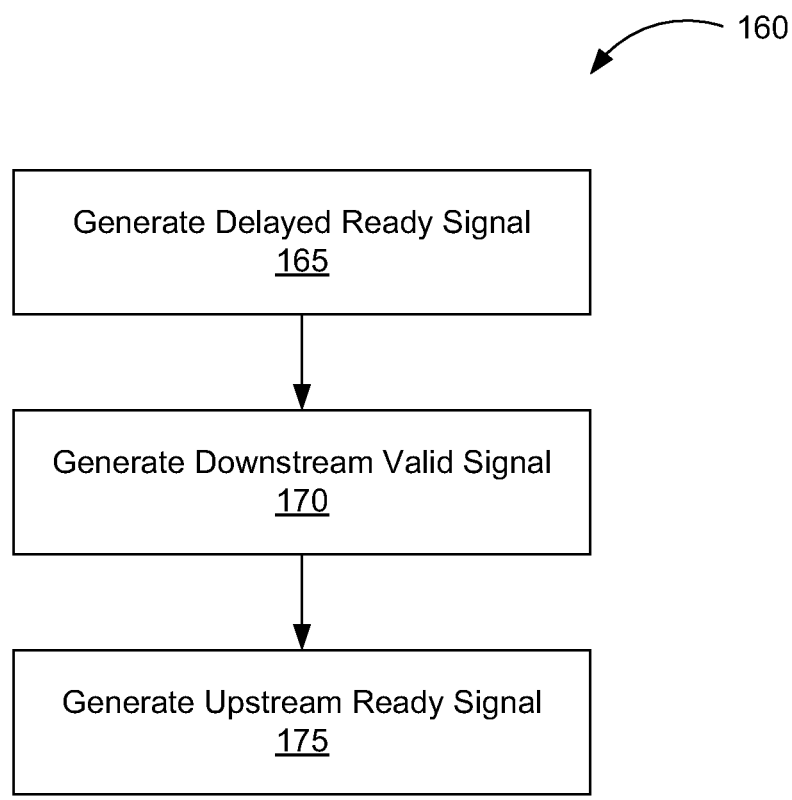
FIG. 1A illustrates a flowchart of a method for generating flow-control signals for a processing pipeline, in accordance with one embodiment.

FIG. 1A illustrates a flowchart of a method 160 for generating flow-control signals for a processing pipeline, in accordance with one embodiment. At step 165, a first pipeline stage generates a delayed ready signal based on a throttle disable signal and a downstream ready signal that is received from a second pipeline stage that is downstream from the first pipeline stage. At step 170, the first pipeline stage generates a downstream valid signal based on an upstream valid signal and the delayed ready signal. The downstream valid signal is output by the first pipeline stage to the second pipeline stage.

In the context of the following description, the downstream valid signal that is generated based on the delayed ready signal may be a throttled downstream valid signal. At step 175, the first pipeline stage generates an upstream ready signal based on the delayed ready signal and the downstream valid signal. The upstream ready signal is output by the first pipeline stage to an upstream pipeline stage that is coupled to the first pipeline stage. In the context of the following description, the upstream ready signal that is generated based on the delayed ready signal may be a throttled upstream ready signal.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
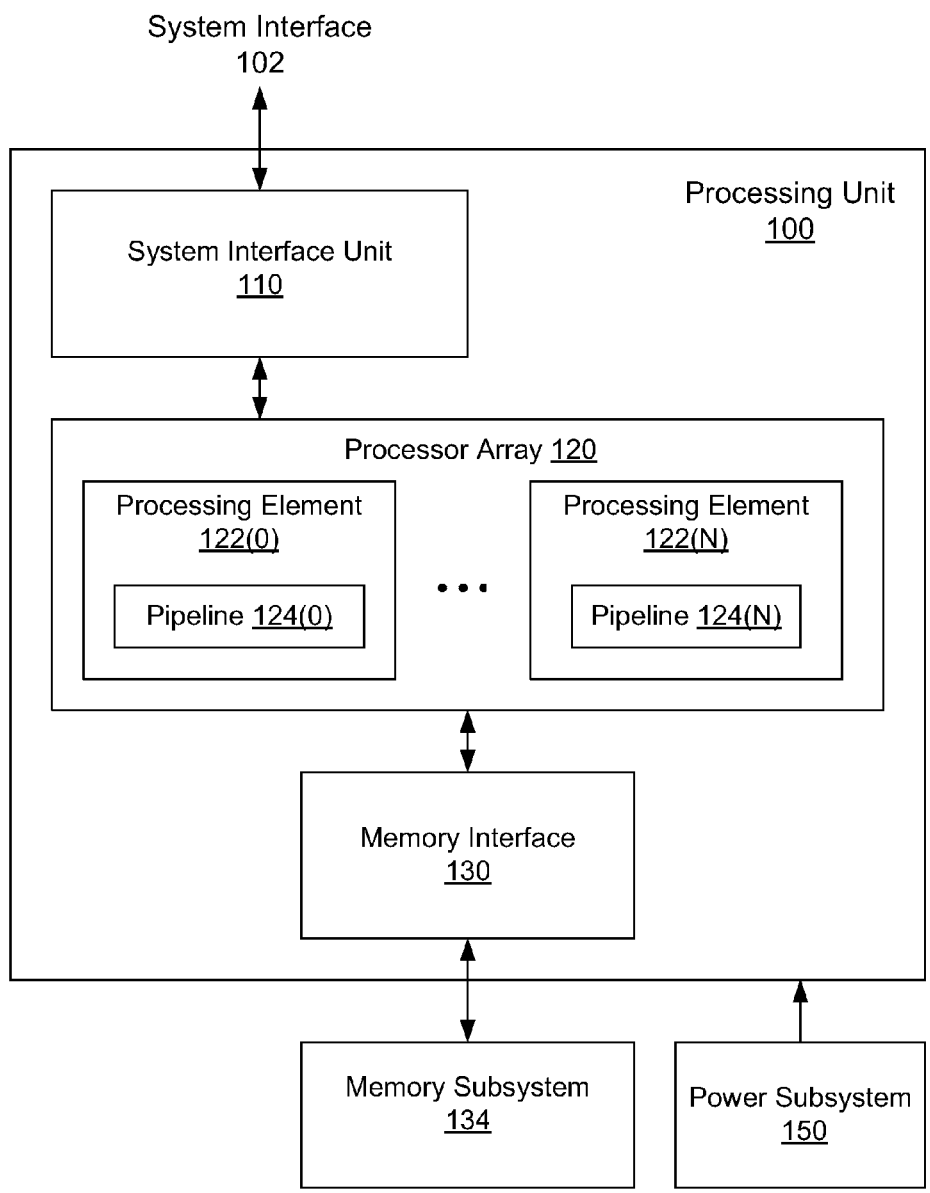
FIG. 1B illustrates a processing unit configured to include one or more processing pipelines, in accordance with one embodiment.

FIG. 1B illustrates a processing unit 100 configured to include one or more processing pipelines 124, in accordance with one embodiment. As shown, processing unit 100 includes a system interface unit 110, a processor array 120, and a memory interface 130. The processing unit 100 is coupled to a memory subsystem 134 and a power subsystem 150. System interface unit 110 is coupled to system interface 102 which may comprise any technically feasible interface, such as PCI (Peripheral Component Interconnect) or PCI-Express. Processor array 120 includes one or more processing element 122 configured to perform data processing functions. A processing pipeline 124 is configured to perform specified operations, each organized as a sequence of sub-operations mapped onto individual pipeline stages. Processing pipeline 124 may be configured to execute instructions stored in a memory system, such as memory subsystem 134. Processing pipeline 124 may also be configured to execute fixed operations determined by specific structures and parameters associated with the processing pipeline. A given processing pipeline 124 may implement a central processing unit (CPU) execution pipeline, a graphics processing unit (GPU) execution pipeline, or any other technically feasible computation pipeline. Memory interface 130 is configured to enable processor array 120 to access data residing within memory subsystem 134.

Power subsystem 150 is coupled to processing unit 100 and configured to deliver electrical power to the processing unit. In a practical setting, power subsystem 150 implements a response time on the order of microseconds to milliseconds with respect to varying load conditions. Capacitance from parasitic circuit board capacitance and decoupling capacitors (not shown) coupled to power rails fed by the power subsystem typically provide faster response times with relatively low series inductance. Such capacitance may act to both source and sink current in response varying loads, thereby stabilizing voltage levels across the power rails. On-chip power distribution networks within processing unit 100 transmit electrical power to internal circuitry, such as processing pipelines 124. The on-chip power distribution networks include both series inductance and parasitic capacitance and may include engineered capacitive structures for stabilizing voltage levels of associated internal power rails. The on-chip power distribution network should be engineered to provide adequate voltage to client circuits under any possible load scenario. Restarting a stalled processing pipeline can result in a relatively large increase in load over sufficiently small time span as to cause a voltage droop in local power rails feeding the processing pipeline. In such a scenario, neither the power subsystem 150, nor any intervening decoupling capacitors are able to respond quickly enough to the transient load to prevent the voltage droop. Persons skilled in the art will understand that such a voltage droop may cause increased propagation delays in circuitry of the processing pipeline. However, voltage droop resulting from multiple pipeline stages within one or more pipelines 124 simultaneously transitioning from an idle to active state may be advantageously avoided by staggering the clock cycles at which different pipeline stages restart processing (i.e., become active) after being idle. Such staggering may be accomplished by throttling upstream propagation of the ready signal through the pipeline stages, as illustrated below in FIGS. 2, 3B, and 4.

Figure 2:
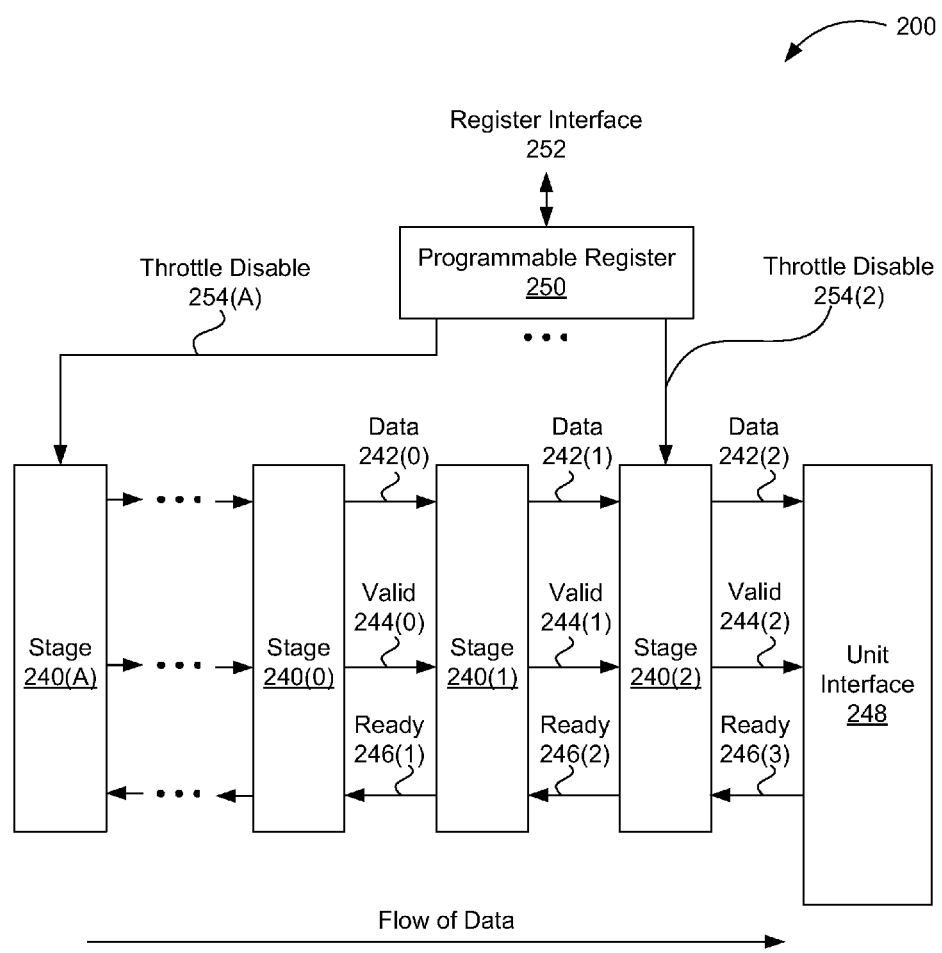
FIG. 2 illustrates a high-level architecture for a processing pipeline configured to throttle pipeline restarts, in accordance with one embodiment.

FIG. 2 illustrates a high-level architecture for a processing pipeline 200 configured to throttle pipeline restarts, in accordance with one embodiment. As shown, processing pipeline 200 includes pipeline stages 240 and unit interface 248. In one embodiment, each pipeline stage 240 implements a flow-control protocol using a one-bit ready signal 246 and a one-bit valid signal 244. When a ready signal 246 and a valid signal 244 are both true at a particular boundary during the same clock cycle, associated data is transmitted from a source pipeline state to a destination pipeline stage. For example, when ready signal 246(2) and valid signal 244(1) are both true, data signal 242(1) transmits corresponding data from pipeline stage 240(1) to pipeline stage 240(2). As shown, each valid signal 244 is marked according to which pipeline stage 240 generated the valid signal. The data signals 242 may be one or more bits and the number of bits may vary for each pipeline stage 240. Each data signal 242 is also marked according to which pipeline stage 240 generated the data signal. Similarly, each ready signal 246 is marked according to which pipeline stage 240 generated the ready signal. Inbound data is processed by a given pipeline stage 240 and presented as outbound data. For example, pipeline stage 240(2) receives inbound data through data signal 242(1) and transmits outbound data through data signal 242(2). The flow of data is indicated in FIG. 2 and, in the context of the following description, the data flows in what is referred to as the downstream direction. For example, the pipeline stage 240(0) is upstream relative to the pipeline stage 240(1) and the pipeline stage 240(2) is downstream relative to the pipeline stage 240(1).

In one embodiment, processing pipeline 200 also includes a programmable register 250 that is configured to generate throttle disable signals 254. In one embodiment, at least one pipeline stage 240 implements a throttle mechanism controlled by a corresponding throttle disable signal 254. The throttle mechanism temporarily defers reporting that a corresponding pipeline stage is ready, thereby stalling a portion of the processing pipeline 200 upstream of the pipeline stage to limit transient restart current and therefore voltage droop within the processing pipeline. When a pipeline stage 240 defers asserting the ready signal as true in response to a throttle disable signal 254, invalid data is stored by the pipeline stage 240. In other words, the valid signal 244 corresponding to the data 242 for the pipeline stage 240 is false. In the context of the current description, invalid data within a pipeline stage is commonly referred to as a bubble. The throttle mechanism therefore may cause one or more pipeline stages 240 to generate bubbles in the processing pipeline 200.

As shown in FIG. 2, pipeline stage 240(A) is configured to respond to a throttle disable signal 254(A), and pipeline stage 240(2) is configured to respond to a throttle disable signal 254(2). An exemplary flow-control circuit for pipeline stages 240(A), 240(2), and other pipeline stages configured to respond to a throttle disable signal 254 is described in greater detail in conjunction with FIG. 3B. Pipeline stages 240(0) and 240(1) may implement conventional flow-control circuitry, such as a flow-control circuit illustrated below in FIG. 3A. Because the flow-control protocol for both conventional and throttle-enabled pipeline stages is consistent, a processing pipeline may be implemented having an arbitrary mix of both conventional and throttle-enabled pipeline stages.

Unit interface 248 is configured to receive data from pipeline stage 240(2) through data signal 242(2) using the flow-control protocol implemented by valid signal 244(2) and ready signal 246(3). In certain scenarios, unit interface 248 is configured to transmit data from data signal 242(2) to an arbitrated resource, such as a memory system or interconnect system. Because unit interface 248 may not always be ready to receive data from pipeline stages 240 at a rate at which the data is generated, unit interface 248 may sometimes need to assert ready signal 246(3) false, thereby stalling the processing pipeline. In certain embodiments, one or more pipeline stages may also be configured to stall the processing pipeline even when the particular pipeline stage is not stalled or throttled. For example, a pipeline stage that generates three outbound data transfers to a downstream pipeline stage for every two inbound data transfers from an upstream pipeline stage will need to stall the inbound data one cycle for every two cycles. The overall effect is the generation of upstream stalls when ready signals are false.

Figure 3A:
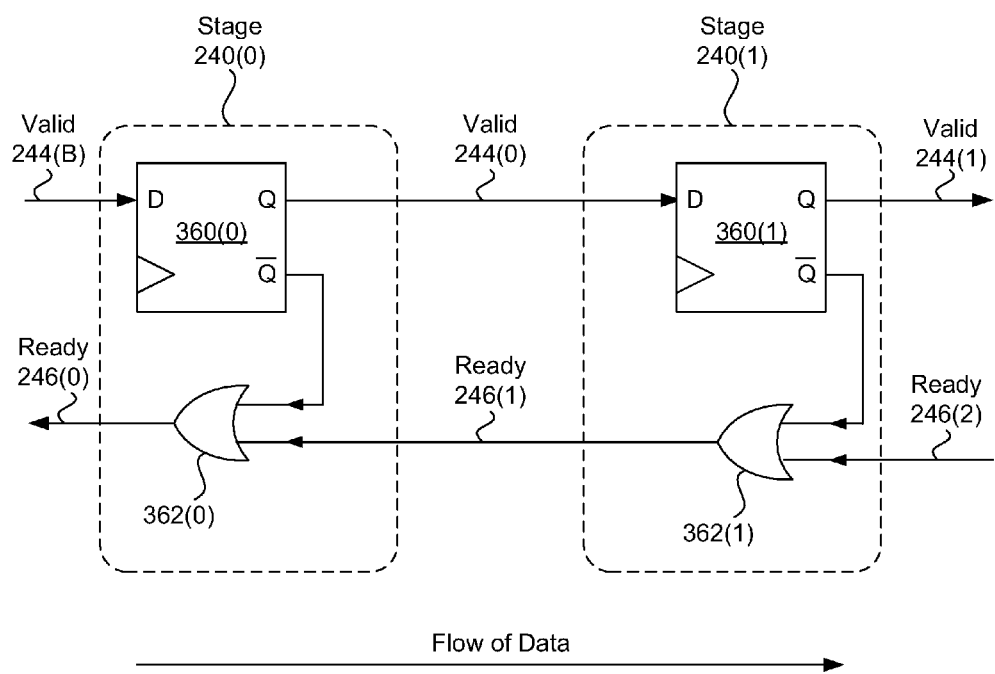
FIG. 3A illustrates exemplary flow-control logic for a pipeline stage, in accordance with one embodiment.

FIG. 3A illustrates an exemplary flow-control circuit for a pipeline stage 240(0), in accordance with one embodiment. The flow-control circuit comprises flip-flop 360(0) and OR-gate 362(0). Flip-flop 360(0) stores a valid state for data residing within pipeline stage 240(0). This data is presented as data signal 242(0). If the valid state is true (logic level "1", voltage level "high"), then the corresponding data is valid. If the valid state is false (logic level "0", voltage level "low"), then the corresponding data is not valid. Persons of ordinary skill in the art will understand that the polarity of the valid and/or ready signals may be reversed and the associated circuitry may be changed accordingly so that valid data propagates downstream and stalls propagate upstream.

The valid state is transmitted as valid signal 244(0) to pipeline stage 240(1). A ready signal 246(1) indicates whether pipeline stage 240(1) is ready to receive new data from pipeline stage 240(0). When ready signal 246(1) is false, then data residing within pipeline stage 240(0) cannot be transferred to the pipeline stage 240(1). Therefore, the data residing within pipeline stage 240(0) is stored within the pipeline stage 240(0) for another clock cycle. In one embodiment, a multiplexor (not shown) transmits data from data signal 242(0) back to storage elements (not shown) configured to store data residing within pipeline stage 240(0) when ready signal 246(1) is false.

In the context of the description, invalid data within a pipeline stage is referred to as a bubble in the processing pipeline 200 and overwriting invalid data is referred to as collapsing a bubble. A chain of OR-gates 362 allows a terminal receiver of data, such as interface unit 248 of FIG. 2 to propagate a ready signal upstream (i.e., backwards) through an entire processing pipeline, while also enabling each pipeline stage to collapse local bubbles. For example, the OR-gate 362(0) will collapse a bubble when the ready signal 246(1) is false and the valid signal 244(0) is false (indicating that the data output by the pipeline stage 240(0) is invalid or a bubble. Rather than propagating the ready signal 246(1) false value upstream, the ready signal 246(0) output by the OR-gate 262(0) is true because "Q-bar" output by flip-flop 360(0) equals the logical inverse of valid signal 244(0).

Figure 3B:
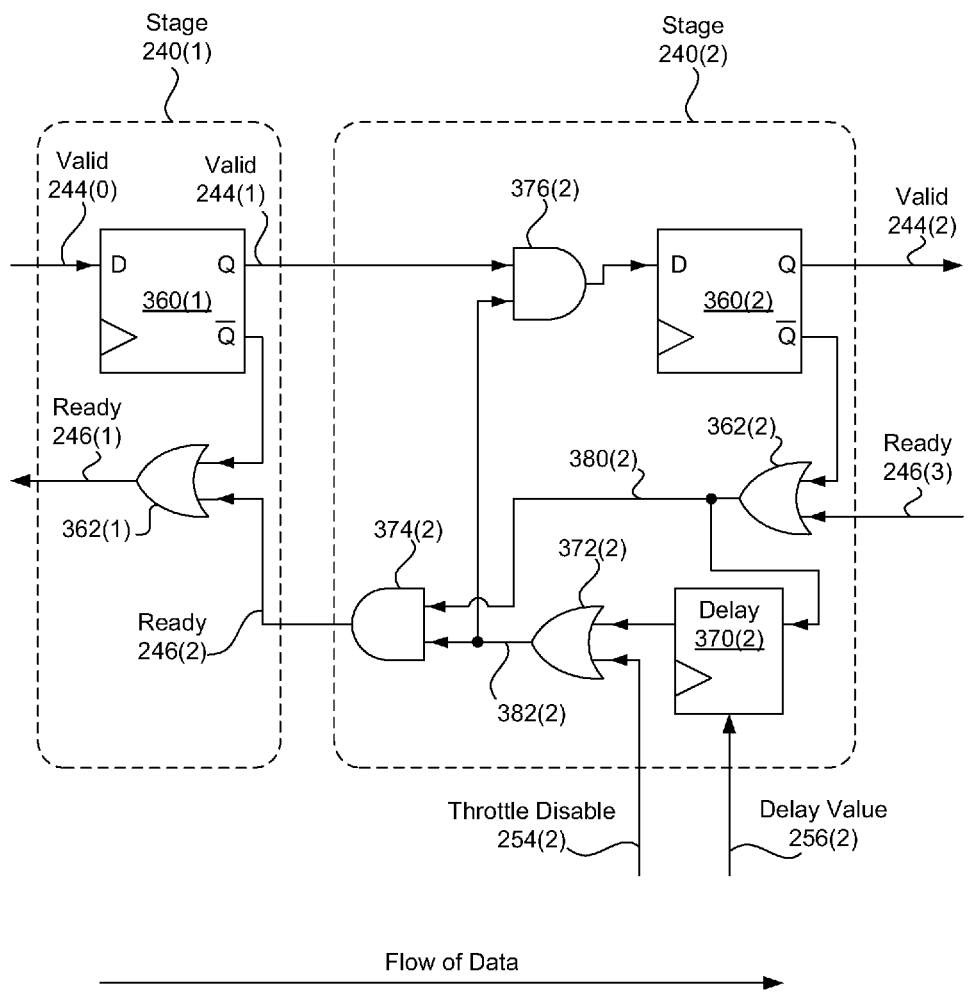
FIG. 3B illustrates exemplary throttle-enabled flow-control logic for a pipeline stage, in accordance with one embodiment.

FIG. 3B illustrates an exemplary throttle-enabled flow-control circuit for a pipeline stage 240(2), in accordance with one embodiment. The throttle-enabled flow-control circuit comprises flip-flip 360(2), OR-gate 362(2), OR-gate 372(2), AND-gate 374(2), AND-gate 376(2), and delay unit 370(2). Inputs to the throttle-enabled flow-control circuit include valid signal 244(1), ready signal 246(3), and throttle disable signal 254(2). Certain embodiments may also include a delay value signal 256(2). The flip-flop 360(2), delay unit 370(2), and flip-flop 360(1) may each also receive a dock input signal (not shown). Outputs generated by the throttle-enabled flow-control circuit include ready signal 246(2) and valid signal 244(2). While an exemplary implementation of the throttle-enabled flow-control circuit is presented here for illustrative purposes, any logically or functionally equivalent throttle-enabled flow-control circuit configured to throttle pipeline restarts is within the scope and spirit of embodiments of the present invention.

When throttle disable signal 254(2) is asserted true (to disable throttling), the throttle-enabled flow-control circuit behaves substantially identically to the flow-control circuit of FIG. 3A. When throttling is disabled, ready signal 246(3) propagates through OR-gate 362(2) to generate internal ready signal 380(2), which further propagates through AND-gate 374(2) to generate ready signal 246(2). Also, valid signal 244(1) is able to propagate through AND-gate 376(2) to a "D" input of flip-flop 360(2).

When throttle disable signal 254(2) is asserted false, throttling is enabled and a false to true transition of ready signal 246(3) is delayed by a duration associated with delay unit 370(2) before propagating to ready signal 246(2). Delaying the false to true transition propagating from ready signal 246(3) to ready signal 246(2) has the effect of holding off pipeline stage 240(1) and other upstream pipeline stages from transferring data downstream for the duration associated with the delay unit 370(2). By contrast, a true to false transition of ready signal 246(3) is not delayed because a downstream recipient of data (such as unit interface 248 of FIG. 2) is not ready to receive data from pipeline stage 240(2). Therefore, pipeline stage 240(2) should therefore hold and preserve data until the downstream recipient is ready.

In one embodiment, delay unit 370(2) is configured to synchronously delay internal ready signal 380(2) by N dock cycles to drive OR-gate 372(2) which generates delayed ready signal 382(2), where N is an integer greater than or equal to one. Delayed ready signal 382(2) must be true for upstream ready signal 246(2) to be true and for flip-flop 360(2) to sample and store a true value for valid signal 244(1). In one embodiment, flip-clop 360(2) may comprise an edge-triggered flip-flop, such as a positive edge-triggered flip-flop. In certain embodiments, a delay value signal 256(2) configures delay unit 370(2) to exhibit a propagation delay of N clock cycles. For example, the delay unit 370(2) may comprise a set of flip-flops forming a shift-register and configured to operate synchronously with respect to a clock signal.

Figure 4:
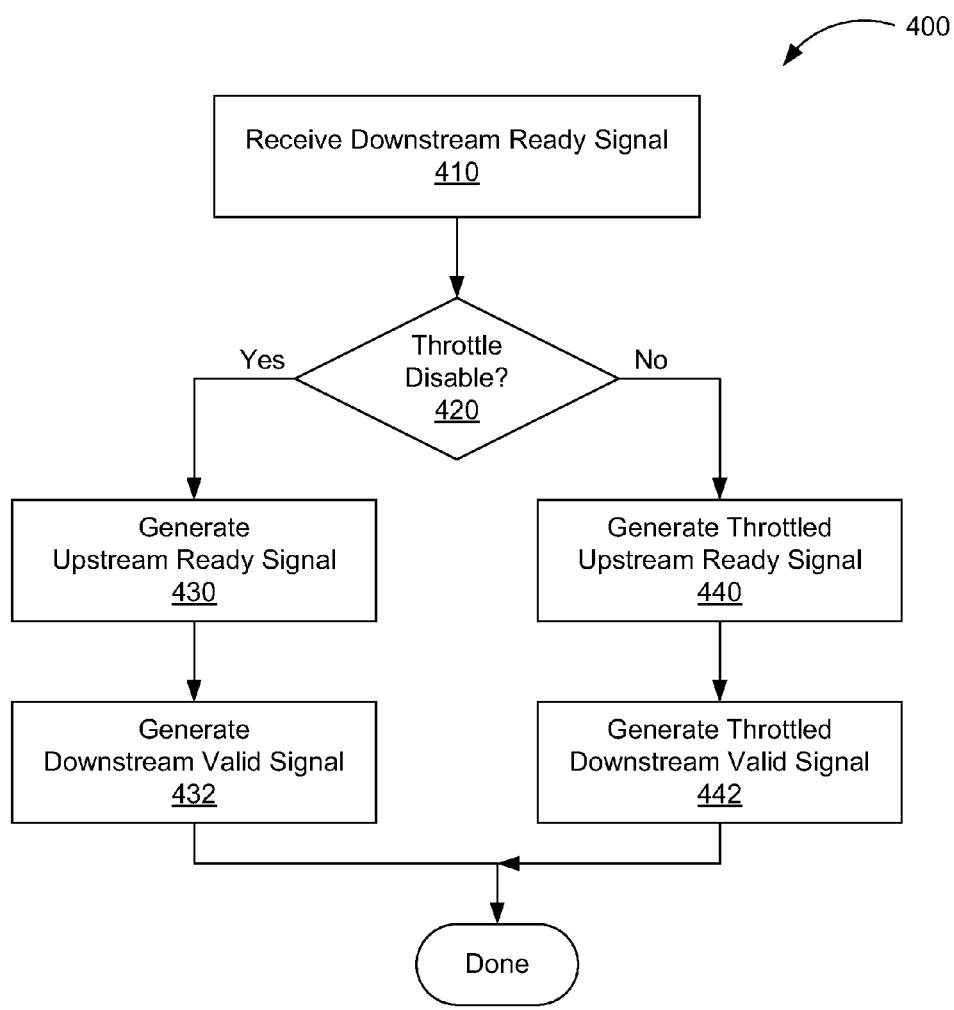
FIG. 4 illustrates a flowchart of a method for generating a flow-control ready signal, in accordance with one embodiment.

FIG. 4 illustrates a flow chart of a method 400 for generating a flow-control ready signal, in accordance with one embodiment. Although method 400 is described in conjunction with FIGS. 1A, 1B, 2, 3A, 3B, and 5, persons of ordinary skill in the art will understand that any system that performs method 400 is within the scope and spirit of embodiments of the present invention. Method 400 may be implemented as a throttle-enabled pipeline stage. In one embodiment, the throttle-enabled pipeline stage comprises logic circuits, such as the throttle-enabled flow-control circuit of FIG. 3B to implement the flow-control protocol described above in FIGS. 2 through 3B.

Method 400 begins in step 410, where a downstream ready signal from a downstream pipeline stage is received by the throttle-enabled pipeline stage. In one embodiment, the downstream ready signal comprises a one-bit digital logic signal, such as ready signal 246(3) of FIG. 3B. If, in step 420, a throttle disable signal, such as throttle disable signal 254(2), is asserted true, then throttling is disabled and the method proceeds to step 430.

In step 430, an upstream ready signal, such as ready signal 246(2), is generated to indicate whether the throttle-enabled pipeline stage is ready to accept new data. In one embodiment, the upstream ready signal is generated by performing a logical OR operation, such as by OR-gate 362(2), between the downstream ready signal (i.e., ready signal 246(3) received from a downstream pipeline stage) and a logical inverse of a downstream valid signal (i.e., valid signal 244(2) output to the downstream pipeline stage).

In step 432, the downstream valid signal, such as valid signal 244(2), is generated to indicate whether valid data is available from the throttle-enabled pipeline stage 240(2). In one embodiment, the downstream valid signal is generated by sampling and storing an upstream valid signal, such as valid signal 244(1) within a storage element, such as flip-flop 360(2). The method 400 may be repeated for the next clock cycle.

Returning to step 420, if the throttle disable signal is asserted false, then throttling is enabled and the method proceeds to step 440. In one embodiment, the throttle disable signal comprises throttle disable signal 254(2).

In step 440, the upstream ready signal is generated to conform to throttling behavior, whereby a false to true transition on the downstream ready signal is propagated with a delay of N clock cycles to the upstream ready signal, but a true to false transition on the downstream ready signal is propagated without the delay (i.e., within the same clock cycle) to the upstream ready signal. In one embodiment, OR-gate 362(2), delay unit 370(2). OR-gate 372(2), and AND-gate 374(2) comprise a propagation path from the downstream ready signal to the upstream ready signal. In such an embodiment, OR-gate 372(2) generates delayed ready signal 382(2), which is used to gate AND-gate 374(2) from asserting a value of true on the upstream ready signal until after a specified delay associated with delay unit 370(2). The number of clock cycles N by which the delayed ready signal 382(2) is delayed relative to the ready signal 246(3) may be fixed or programmed via the delay value 256(2).

In step 442, the downstream valid signal is generated to indicate whether valid data is available from the throttle-enabled pipeline stage. Here, the downstream valid signal is generated to conform to throttling behavior, whereby the downstream valid signal is asserted false for a certain time delay (e.g., N clock cycles) after the downstream ready signal is asserted true. In one embodiment, the time delay is associated with delay unit 370(2).

Figure 5:
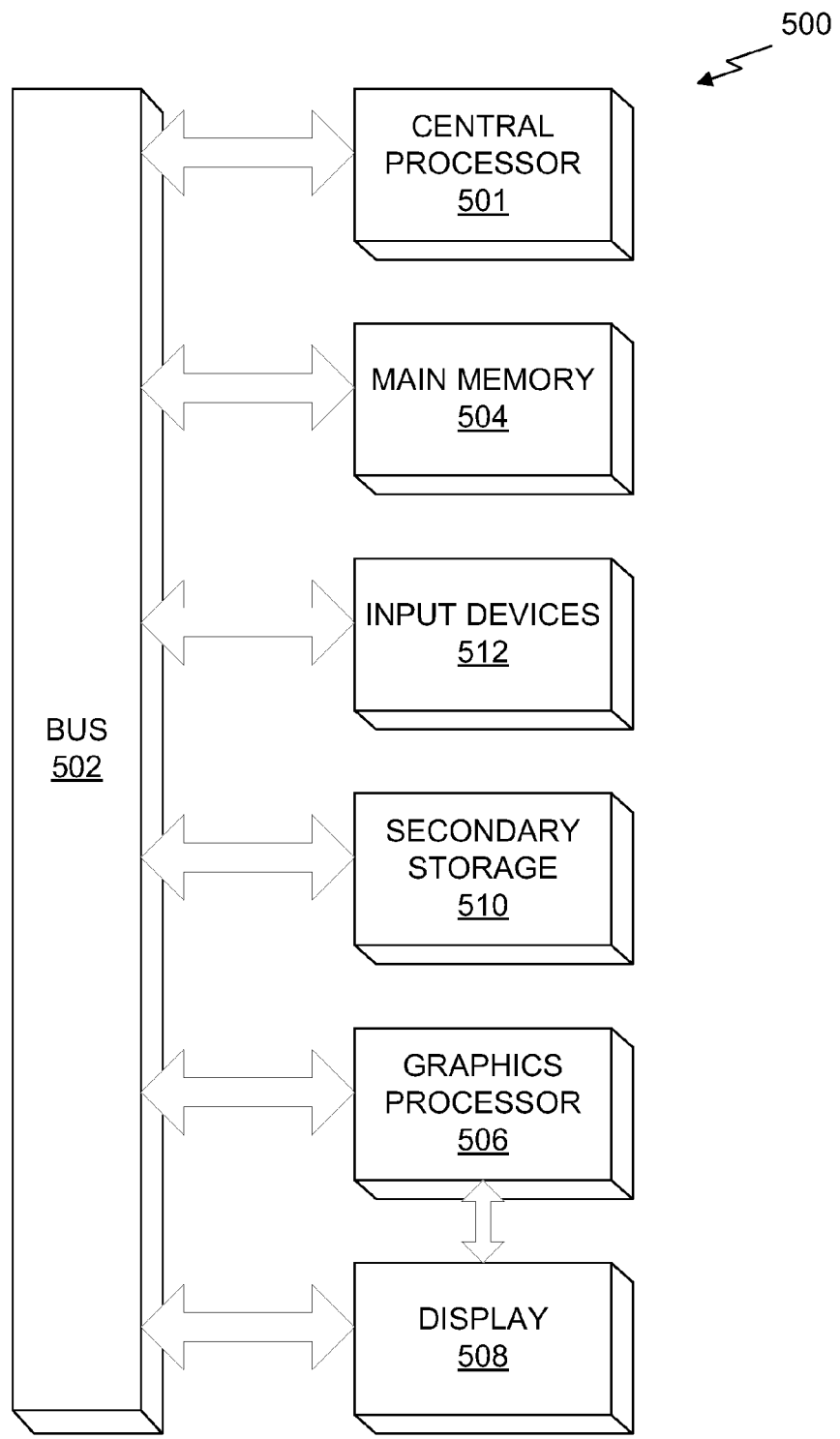
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504, which may take the form of random access memory (RAM).

The system 500 also includes input devices 512, a graphics processor 506, and a display 508, i.e., a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

The architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

In one embodiment, graphics processor 506 is configured to include one or more processing pipelines, as described in FIGS. 3A-3B. In certain embodiments, graphics processor 506 comprises processing unit 100 of FIG. 1B. In certain other embodiments, central processor 501 comprises processing unit of FIG. 1B.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating flow-control signals, comprising:
    generating, by a first pipeline stage, a delayed ready signal based on a downstream ready signal that is received from a second pipeline stage and a throttle disable signal;
    generating, by the first pipeline stage, a downstream valid signal based on an upstream valid signal and the delayed ready signal; and,
    generating, by the first pipeline stage, an upstream ready signal based on the delayed ready signal and the downstream valid signal;
    wherein generating the delayed ready signal comprises:
    generating an internal ready signal by performing a logic OR operation between the downstream ready signal and a logical inverse of the downstream valid signal,
    generating a delayed internal ready signal based on the internal ready signal and a time delay, and
    performing a logical OR operation between the delayed internal ready signal and the throttle disable signal to generate the delayed ready signal.

2. The method of claim 1, wherein the time delay comprises a synchronous time delay of N clock cycles.

3. The method of claim 1, wherein generating the upstream ready signal comprises performing a logical AND operation between the internal ready signal and the delayed ready signal.

4. A method for generating flow-control signals, comprising:
    generating, by a first pipeline stage, a delayed ready signal based on a downstream ready signal that is received from a second pipeline stage and a throttle disable signal;
    generating, by the first pipeline stage, a downstream valid signal based on an upstream valid signal and the delayed ready signal; and,
    generating, by the first pipeline stage, an upstream ready signal based on the delayed ready signal and the downstream valid signal;
    wherein generating the downstream valid signal comprises:
    performing a logical AND operation between the upstream valid signal and the delayed ready signal to generate a combinational valid signal, and
    storing the combinational valid signal in a storage circuit coupled to the downstream valid signal to generate the downstream valid signal.

5. The method of claim 4, wherein the storage circuit comprises a flip-flop.

6. The method of claim 1, wherein the throttle disable signal is generated by a programmable register.

7. The method of claim 1, wherein data is transmitted from the first pipeline stage to the second pipeline stage when the downstream valid signal is true and the downstream ready signal is true.

8. A method for generating flow-control signals, comprising:
    generating, by a first pipeline stage, a delayed ready signal based on a downstream ready signal that is received from a second pipeline stage and a throttle disable signal;
    generating, by the first pipeline stage, a downstream valid signal based on an upstream valid signal and the delayed ready signal; and,
    generating, by the first pipeline stage, an upstream ready signal based on the delayed ready signal and the downstream valid signal;
    wherein a false to true transition on the downstream ready signal is propagated with a delay to the upstream ready signal and a true to false transition on the downstream ready signal is propagated without the delay to the upstream ready signal when throttling is enabled according to the throttle enable signal.

9. A method for generating flow-control signals, comprising:
    generating, by a first pipeline stage, a delayed ready signal based on a downstream ready signal that is received from a second pipeline stage and a throttle disable signal;
    generating, by the first pipeline stage, a downstream valid signal based on an upstream valid signal and the delayed ready signal; and,
    generating, by the first pipeline stage, an upstream ready signal based on the delayed ready signal and the downstream valid signal;
    wherein a false to true transition on the downstream ready signal is propagated without a delay to the upstream ready signal and a true to false transition on the downstream ready signal is propagated without the delay to the upstream ready signal when throttling is disabled according to the throttle enable signal.

10. The method of claim 1, wherein the delayed ready signal is configured to assert the downstream valid signal false for a number of clock cycles after the downstream ready signal is asserted true when throttling is enabled according to the throttle enable signal.

11. A pipeline stage circuit, configured to:
    generate a delayed ready signal based on a downstream ready signal that is received from a downstream pipeline stage circuit and a throttle disable signal;
    generate a downstream valid signal based on an upstream valid signal and the delayed ready signal; and
    generate an upstream ready signal based on the delayed ready signal and the downstream valid signal;
    wherein generating the delayed ready signal comprises:
    generating an internal ready signal by performing a logic OR operation between the downstream ready signal and a logical inverse of the downstream valid signal,
    generating a delayed internal ready signal based on the internal ready signal and a time delay, and
    performing a logical OR operation between the delayed internal ready signal and the throttle disable signal to generate the delayed ready signal.

12. The pipeline stage circuit of claim 11, wherein generating the upstream ready signal comprises performing a logical AND operation between the internal ready signal and the delayed ready signal.

13. A pipeline stage circuit, configured to:
generate a delayed ready signal based on a downstream ready signal that is received from a downstream pipeline stage circuit and a throttle disable signal;
generate a downstream valid signal based on an upstream valid signal and the delayed ready signal; and
generate an upstream ready signal based on the delayed ready signal and the downstream valid signal;
wherein generating the downstream valid signal comprises:
performing a logical AND operation between the upstream valid signal and the delayed ready signal to generate a combinational valid signal, and
storing the combinational valid signal in a storage circuit coupled to the downstream valid signal to generate the downstream valid signal.

14. The pipeline stage circuit of claim 11, wherein data is transmitted from the first pipeline stage to the second pipeline stage when the downstream valid signal is true and the downstream ready signal is true.

15. A pipeline stage circuit, configured to:
generate a delayed ready signal based on a downstream ready signal that is received from a downstream pipeline stage circuit and a throttle disable signal;
generate a downstream valid signal based on an upstream valid signal and the delayed ready signal; and
generate an upstream ready signal based on the delayed ready signal and the downstream valid signal;
wherein a false to true transition on the downstream ready signal is propagated with a delay to the upstream ready signal and a true to false transition on the downstream ready signal is propagated without the delay to the upstream ready signal when throttling is enabled according to the throttle enable signal.

16. A pipeline stage circuit, configured to:
generate a delayed ready signal based on a downstream ready signal that is received from a downstream pipeline stage circuit and a throttle disable signal;
generate a downstream valid signal based on an upstream valid signal and the delayed ready signal; and
generate an upstream ready signal based on the delayed ready signal and the downstream valid signal;
wherein a false to true transition on the downstream ready signal is propagated without a delay to the upstream ready signal and a true to false transition on the downstream ready signal is propagated without the delay to the upstream ready signal when throttling is disabled according to the throttle enable signal.

17. The pipeline stage circuit of claim 11, wherein the delayed ready signal is configured to assert the downstream valid signal false for a number of clock cycles after the downstream ready signal is asserted true when throttling is enabled according to the throttle enable signal.

18. A system, comprising:
a processing pipeline comprising:
a first pipeline stage configured to:
generate a delayed ready signal based on a downstream ready signal and a throttle disable signal,
generate a downstream valid signal based on an upstream valid signal and the delayed ready signal, and
generate an upstream ready signal based on the delayed ready signal and the downstream valid signal; and
a second pipeline stage coupled to the first pipeline stage to receive the downstream valid signal and configured to generate the downstream ready signal that is received by the first pipeline stage;
wherein generating the delayed ready signal comprises:
generating an internal ready signal by performing a logic OR operation between the downstream ready signal and a logical inverse of the downstream valid signal,
generating a delayed internal ready signal based on the internal ready signal and a time delay, and
performing a logical OR operation between the delayed internal ready signal and the throttle disable signal to generate the delayed ready signal.

\* \* \* \* \*